(12) United States Patent
Breuing

(10) Patent No.: US 9,014,956 B2
(45) Date of Patent: Apr. 21, 2015

(54) DISTANCE DETERMINATION AND TYPE OF AIRCRAFT DETERMINATION DURING DOCKING AT THE GATE

(75) Inventor: Holger Breuing, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/531,927

(22) Filed: Jun. 25, 2012

(65) Prior Publication Data

US 2013/0060457 A1    Mar. 7, 2013

(30) Foreign Application Priority Data

Jul. 6, 2011    (DE) .................. 10 2011 078 746

(51) Int. Cl.
| | | |
|---|---|---|
| G01S 13/91 | (2006.01) | |
| G01G 5/06 | (2006.01) | |
| G08G 1/16 | (2006.01) | |
| G01S 7/41 | (2006.01) | |
| G01S 13/08 | (2006.01) | |
| G01S 13/42 | (2006.01) | |
| G01S 13/87 | (2006.01) | |
| G01S 13/93 | (2006.01) | |

(52) U.S. Cl.
CPC . *G08G 1/167* (2013.01); *G01S 7/41* (2013.01); *G01S 13/08* (2013.01); *G01S 13/42* (2013.01); *G01S 13/87* (2013.01); *G01S 2013/9314* (2013.01)

(58) Field of Classification Search
USPC ............... 701/3, 120; 219/492; 340/933, 655, 340/945; 356/4.01; 14/71.5; 342/393, 451
See application file for complete search history.

(56) References Cited

U.S. PATENT DOCUMENTS

| | | | | | |
|---|---|---|---|---|---|
| 2,439,663 | A | * | 4/1948 | Lewis | 342/393 |
| 3,866,229 | A | * | 2/1975 | Hammack | 342/451 |
| 4,990,897 | A | * | 2/1991 | Beyma et al. | 340/665 |
| 5,508,697 | A | * | 4/1996 | Kato et al. | 340/933 |
| 7,792,614 | B2 | * | 9/2010 | Giazotto | 701/3 |
| 2005/0198750 | A1 | * | 9/2005 | Spencer et al. | 14/71.5 |
| 2007/0032919 | A1 | * | 2/2007 | Giazotto | 701/3 |
| 2007/0222969 | A1 | * | 9/2007 | Millgard | 356/4.01 |
| 2007/0295712 | A1 | * | 12/2007 | Forman et al. | 219/492 |
| 2013/0060457 | A1 | * | 3/2013 | Breuing | 701/120 |

FOREIGN PATENT DOCUMENTS

WO    WO 2009/047292    4/2009

* cited by examiner

*Primary Examiner* — Tuan C. To
*Assistant Examiner* — Yuri Kan
(74) *Attorney, Agent, or Firm* — Kenyon & Kenyon LLP

(57) ABSTRACT

A device for detecting an object moving in a space includes a measuring device aimed at the object, the measuring device detecting a distance pattern which contains the distances of at least two different points on the object to the measuring device. The measuring device detects the object in the space if at least one part of the distance pattern remains constant over time.

15 Claims, 5 Drawing Sheets

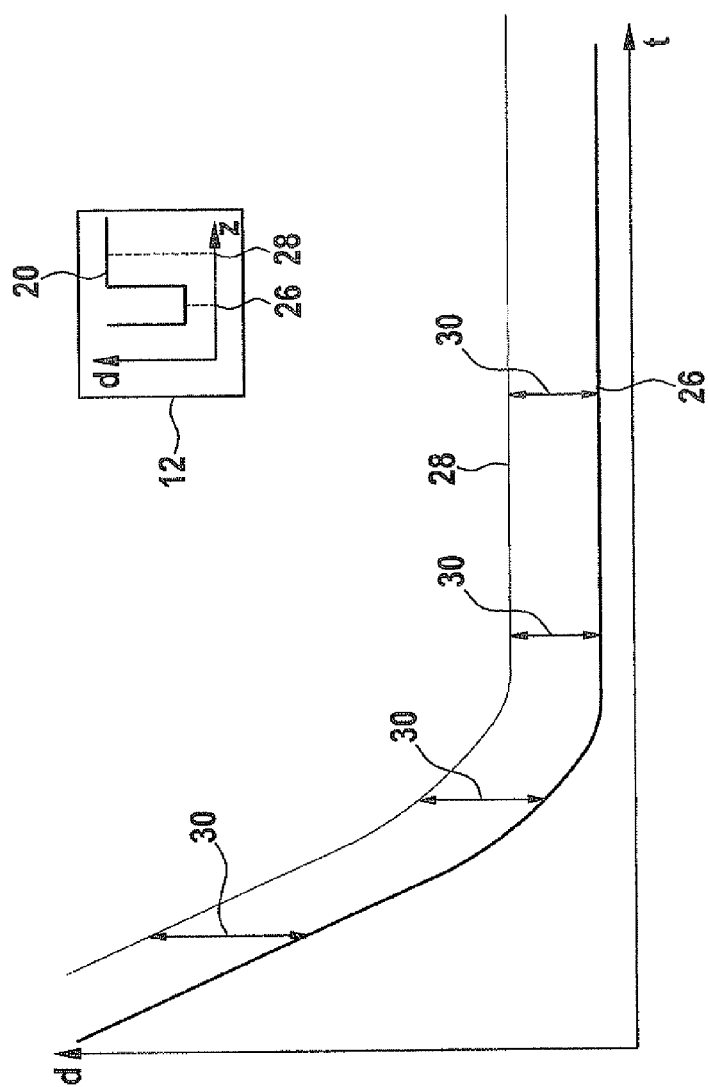

DISTANCE DETERMINATION AND TYPE OF AIRCRAFT DETERMINATION DURING DOCKING AT THE GATE

BACKGROUND OF THE INVENTION

1. Field of the Invention

The present invention relates to a system and a method for detecting and determining the position of a moving object in a space, and more particularly relates to docking guidance system for supporting a docking procedure of an aircraft at a gate in an airport.

2. Description of the Related Art

In an airport, docking guidance systems are used for providing information to aircraft pilots concerning the position of their aircraft when docking at the gate with the aid of signals and directing them into the exact parking position in front of the gate. This is necessary because the jetway must be placed exactly at the aircraft door for boarding and disembarking. An indicator panel in front of the aircraft at the pilot's eye level indicates to the pilot the distance to the final stopping point, the parking position. To that end, the docking guidance system must generally identify the aircraft type of the aircraft to be parked. Often the approach velocity to the gate is displayed in addition. In conventional docking guidance systems, lasers, LADAR, ground sensors or video cameras having automatic image recognition are used for ascertaining this information. However, the performance of such optical systems decreases sharply in certain situations. For example, optical systems are capable of determining the position of an aircraft at great distances very imprecisely. Also, unfavorable light and weather conditions severely limit the accuracy of the position determination. If the aircraft moves in front of a background having a color similar to that of the aircraft, the absence of contrast also adversely affects the measuring result.

Published international patent application document WO 2009/047292 A1 describes a detection device having a radar sensor, which scans a passing aircraft from two different angles on a taxiway in order to determine if the aircraft is rolling on the center line of the taxiway.

BRIEF SUMMARY OF THE INVENTION

According to a first aspect of the present invention, a device for detecting an object moving in a space has a measuring device aimed at the object, the measuring device being provided for detecting a distance pattern which contains the distances of at least two different points on the object to the measuring device, and for detecting the object in the space, if at least one part of the distance pattern remains constant over time.

The device according to the present invention has the advantage that in contrast to optical systems, it is able to reliably detect the object in a space independent of the distance of the object to the device, independent of the weather and light conditions and independent of the contrasts of the object to its surroundings, and, if necessary, determine its position and the type of the object. This is even possible when the object moves perpendicularly to the image plane and is apparently standing still for an image processing system. To that end, the space in which the object moves is scanned spatially multiple times. If individual points remain spatially constant in relation to one another, they belong to a moving object. This makes it possible for the object to be detected independently of its distance and its direction of movement in relation to the scanning measuring device, even in poor visibility conditions or low-contrast conditions. To that end, the device has a measuring device aimed at the object which detects a distance pattern which contains the distances of at least two different points on the object to the measuring device. Compared to an image, the distance pattern also represents the distance of the object to the measuring device in the image plane. Even in the case of greater distances to the measuring device, the object in the distance pattern may still be differentiated clearly from other objects or the background, since the background is also at a distance to the object.

The device detects a specific object in the space if at least one part of the distance pattern remains constant over time. Since in the case of objects moving at different rates of speed, individual points between the objects move toward one another or away from one another, the distance between these points changes. A constant distance between two points in the distance pattern thus characterizes a specific object such as, for example, the aircraft in the gate area. In contrast to image processing devices, the device according to the present invention is not only able to detect an object only when it moves perpendicularly to the image plane, the detection is even still possible in unfavorable conditions such as, for example, when the object has such low contrast in relation to the background that both appear as a single object on an image.

In one preferred embodiment of the present invention, the measuring device is provided for identifying the object based on the extension of the constant part of the distance pattern. This identification makes it possible to consider the geometric dimensions of the object to be detected in order, for example, to differentiate one aircraft from another aircraft, since a larger object in the distance pattern has a correspondingly larger constant remaining part.

In another preferred embodiment of the present invention, the measuring device is provided for identifying the object based on the distribution of the measured distances in the constant remaining part of the distance pattern. This identification makes it possible to consider the position of the object in the distance pattern, since an object rotated to the image plane produces a correspondingly distorted constant remaining part in the distance pattern.

In an additional preferred embodiment of the present invention, the measuring device is provided for identifying the object based on the measured distances in the constant remaining part of the distance pattern. This identification makes it possible to consider the spatial position of the object in the space, since a remotely distant object produces a correspondingly weak constant remaining part in the distance pattern.

In another embodiment of the present invention, the measuring device is provided for identifying the object based on the change over time of the measured distances in the distance pattern. This identification makes it possible to consider the movement of the object in the space in order, for example, to differentiate an aircraft docking at the gate from a passing vehicle, since in contrast to a passing vehicle, a docking aircraft produces a constant remaining part in the distance pattern that becomes increasingly stronger due to its movement toward the measuring device.

In another refinement of the present invention, the measuring device is provided for comparing the shape of the constant remaining part of the detected distance pattern with known distance patterns and for identifying the object when the constant part of the detected distance pattern corresponds to a known distance pattern. In this way, it is possible to look up the object to be detected in a table, for example, and thus assign it to a known object, so that the object is unambiguously identifiable. By providing new known distance patterns the device may be expanded continuously by including new identifiable objects.

In one particular refinement, the device has a reference element, the measuring device being provided for determining a distance of the object to the reference element. This makes it possible to determine relative positions of the object in the space in order, for example, to inform the pilot of an aircraft of how far he is still away from the parking position as the reference element.

In one refinement, the measuring device is provided for determining a change of the distance of the object to the reference element over time, so that the approach velocity of the object to the reference element is determinable. This approach velocity may be used, for example, by the pilot of an aircraft as information as to whether he exceeds the maximum velocity in the gate area.

In one preferred refinement of the present invention, a display device is provided for displaying the information from which arises the distance of the object to the reference element and/or the change of the distance of the object to the reference element.

In one particular embodiment of the present invention, the measuring device has a radar sensor which detects points having a high backscatter power for detecting the distance pattern. The high backscatter power as a condition makes it possible to separate objects from the background in advance, the background not having a high backscatter power due to its great distance to the measuring device.

In one refinement of the embodiment, the radar sensor has a heating element which is provided for heating the transmission and/or receiving path of the radar sensor. This makes it possible to free the beam path of the radar sensor from snow and water, whereby the device is usable even more independently of the weather conditions.

In one particular embodiment, the moving object is an aircraft which docks at a gate.

In one refinement, the measuring device detects an object in the gate area which is obstructing the aircraft if the distance pattern has two different areas, the distances of which change at different rates. Since the pilot ordinarily does not have a direct view of the taxiway in the gate area, the device may aid him in detecting such an obstruction and issuing an appropriate warning.

According to another aspect of the present invention, a method for detecting an object moving in a space includes the following steps: detecting a distance pattern which contains the distances of at least two different points on the object to the measuring device, and detecting the object in the space, if at least one part of the distance pattern remains constant over time.

BRIEF DESCRIPTION OF THE DRAWINGS

FIG. 4 shows the curve over time of two distance points from a distance pattern recorded using the measuring configuration according to FIG. 1.

DETAILED DESCRIPTION OF THE INVENTION

Figure 1:
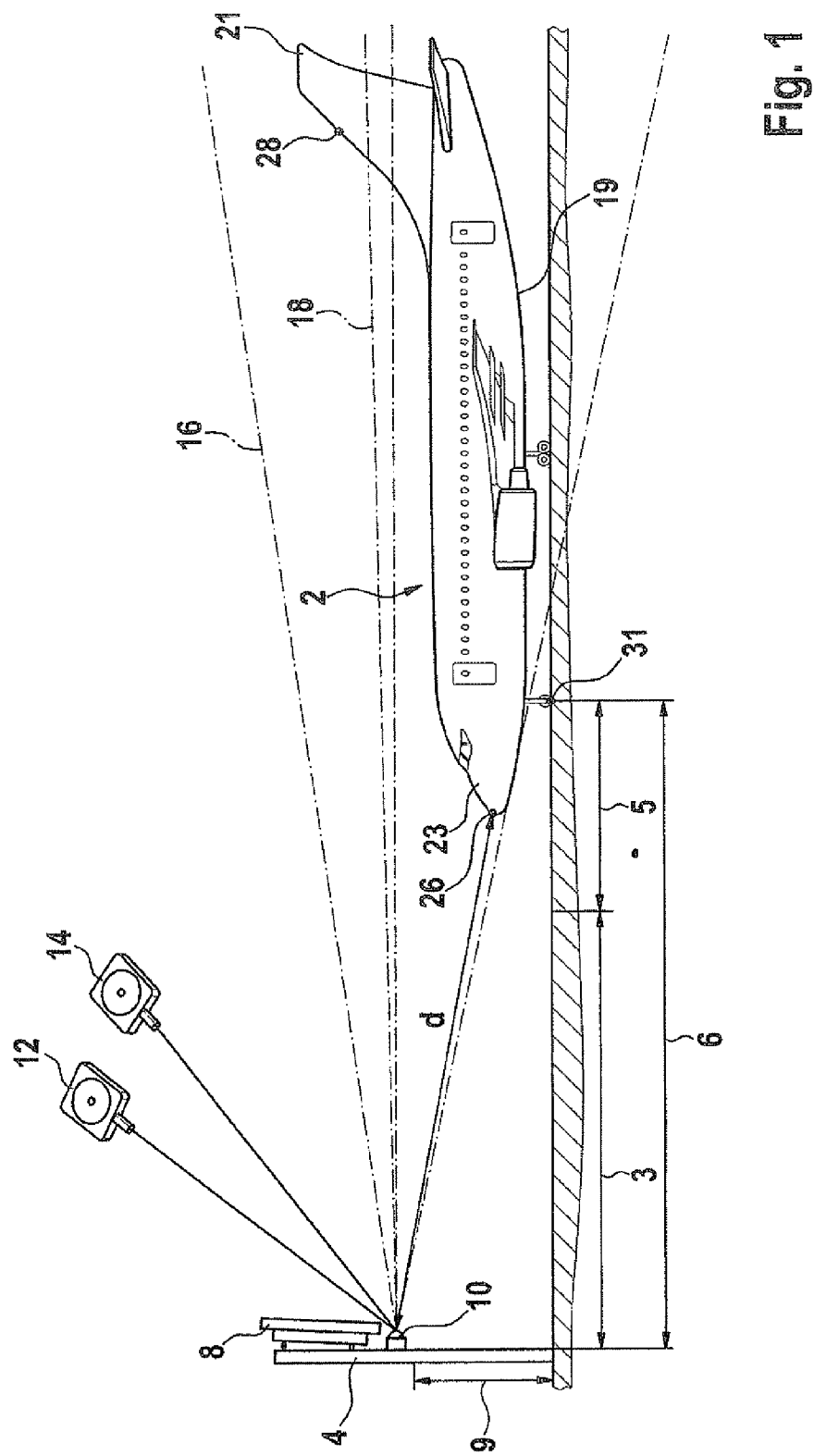
FIG. 1 shows a schematic view of a possible measuring configuration including a device according to the present invention.
Figure 2:
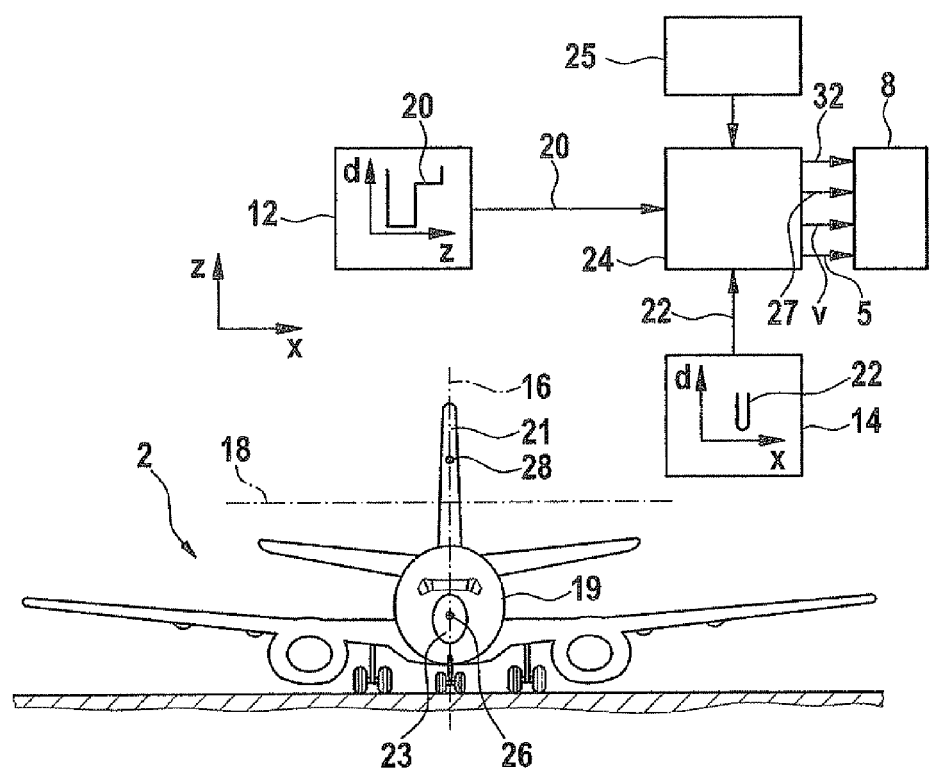
FIG. 2 shows a schematic view of the sensing planes in the measuring configuration according to FIG. 1.

Reference is made to FIG. 1. An aircraft 2 is represented there as an example of a moving object, the aircraft being intended to come to a stop at a predetermined parking position 3 at a gate 4. Since the pilot of the aircraft is personally unable to see parking position 3, parking position distance 5 of his aircraft 2 to parking position 3 is displayed to him on a screen 8 which is located above the ground at a height 9. Below this screen 8 is located a measuring device 10 in which a first radar sensor 12 and a second radar sensor 14 are accommodated. First radar sensor 12 is accommodated horizontally in measuring device 10, so that it scans the space of the gate using a wide vertical angle, preferably at a height of 30°, and using a narrow horizontal angle, preferably 3°. In this way, first radar sensor 12 scans the space of gate 4, at which aircraft 2 is docking, in a vertical sensing plane 16 and ascertains in a manner still to be described whether aircraft 2 is located in this plane. Vertical sensing plane 16 is, as shown in FIG. 2, placed in such a way that it dissects the center of aircraft 2 in the horizontal direction. Second radar sensor 14 is installed in measuring device 10 in an upright position, so that it scans the space of the gate using a narrow vertical angle, preferably at a height of 3°, and using a broad horizontal angle, preferably at a height of 30°. In this way, second radar sensor 14 scans a horizontal sensing plane 18 in the space of the gate and ascertains in a manner still to be described the position in which aircraft 2 is standing. Horizontal sensing plane 18 is placed in such a way that it either dissects fuselage 19 of aircraft 2 or vertical stabilizer 21 of aircraft 2. Both radar sensors 12, 14 together are able to measure aircraft 2, determine the type of aircraft 2 and ascertain additional information of relevance to the pilot.

A front view of aircraft 2 from FIG. 1 including its sensor planes 16, 18 is represented in FIG. 2. For a clearer representation of the present invention, the front view of the aircraft is placed into an xz coordinate system indicated in FIG. 2.

Small rectangles are indicated in FIG. 2 for radar sensors 12, 14 from FIG. 1. Into these rectangles are drawn examples for distance patterns 20, 22, which radar sensors 12, 14 generate in their corresponding sensing planes 16, 18 when aircraft 2 stands in front of parking position 3 in a certain position 6. Distance pattern 20 measured by first radar sensor 12, as seen from first radar sensor 12, contains sensor distances d of different points on aircraft 2 in vertical sensing plane 16 of first radar sensor 12. Sensor distances d thus correspond to the distances between measuring device 10 and aircraft 2 as the object. Distance pattern 20 essentially corresponds to a cross section of aircraft 2 vertically through fuselage 19 and vertical stabilizer 21 in the z direction. Distance pattern 22 measured by second radar sensor 14, as seen from second radar sensor 14, contains sensor distances d of different points on aircraft 2 in horizontal sensing plane 18 of second radar sensor 14. This distance pattern 22 essentially corresponds to a cross section of aircraft 2 horizontally through vertical stabilizer 21 in the x direction. Sensor distance d of nose 23 from first radar sensor 12 is represented in FIG. 1 as an example for sensor distance d of a point 26 on aircraft 2 from first radar sensor 12.

Figure 3A:
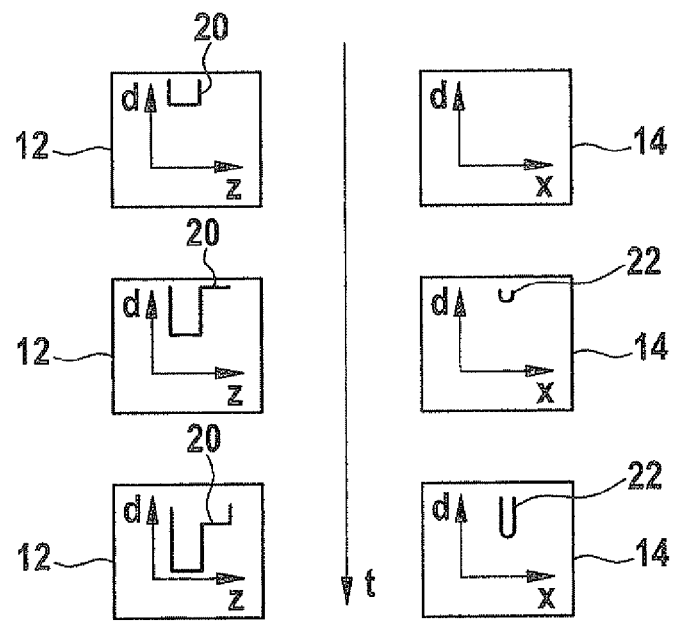
FIG. 3 shows the curve over time of two distance patterns recorded using the measuring configuration according to FIG. 1 for two different scenarios.
Figure 3B:
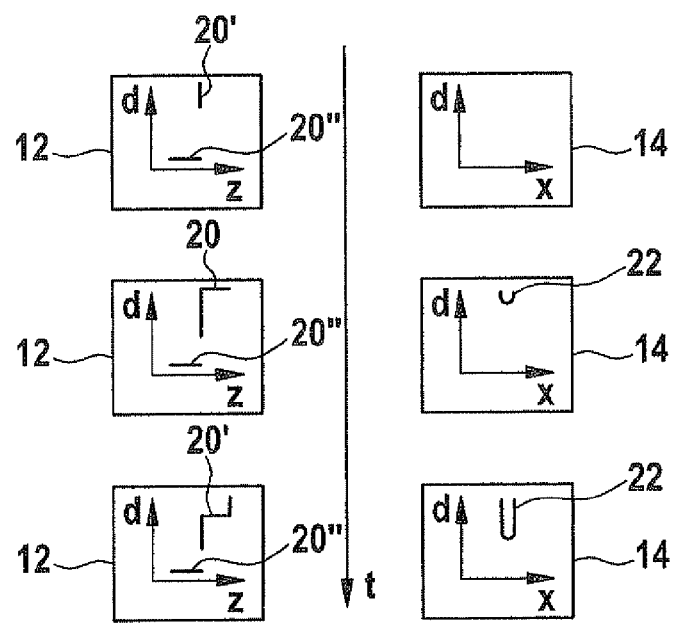

FIG. 3 shows two different curves over time for distance patterns 20, 22. In case a), aircraft 2 moves toward its parking position 3, both radar sensors 16, 18 having a clear view of aircraft 2. In case b), aircraft 2 moves toward its parking position 3, an object (not shown in FIGS. 1 and 2), for example, a container, concealing nose 23 of aircraft 2.

In case a), both distance patterns 20, 22 are made up of the already described cross sections of aircraft 2, sensor distances d of all points becoming uniformly smaller. From the shape of distance pattern 20 measured by first radar sensor 12, it is possible to infer that aircraft 2 is a measuring object per se, since distance pattern 20 has a shape typical for an aircraft. From the shape of distance pattern 22 measured by second radar sensor 14, it is possible to infer the position of aircraft 2. The narrower this distance pattern 22 is, the straighter is the position of aircraft 2 at the gate. If, in contrast to this, aircraft 2 stands at an angle, its vertical stabilizer 21 appears to second radar sensor 16 to be wider and generates a correspondingly wider distance pattern 22.

In case b), if nose 23 of aircraft 2 is, for example, concealed by a container, distance pattern 20 measured by first radar sensor 12 is divided into a movable part 20' and an immovable part 20". While immovable part 20" continuously has the same sensor distances d over time, sensor distances d in movable part 20' become uniformly smaller as in case a). If the container does not reach into horizontal sensing plane 18 of second radar sensor 16, the curve over time of distance pattern 22 measured by second radar sensor 14 corresponds to distance pattern 22 from case a).

For the further extraction of information, these distance patterns 20, 22 may be received by an evaluation device 24 shown in FIG. 2. From distance patterns 20, 22, this evaluation device 24 may output parking position distance 5, approach velocity v of aircraft 2 to parking position 3 or warnings 27 that warn of objects on the taxiway in the gate area. Objects on the taxiway may be ascertained directly if one of distance patterns 20, 22 has an immovable part 20" or two different rapidly moving parts.

For determining parking position distance 5, evaluation device 24 may initially determine the type of aircraft 2 using typical dimensions in distance pattern 20, 22, which will be explained by way of example in FIG. 4. The curve over time of two sensor distances d from distance pattern 20 of first radar sensor 12 of two points 26, 28 is recorded in it. The curve over time of sensor distance d of first point 26 corresponds to the approach over time of nose 23 of aircraft 2 to first radar sensor 12, while the curve over time of sensor distance d of second point 28 corresponds to the approach over time of vertical stabilizer 21 of aircraft 2 to first radar sensor 12.

If aircraft 2 in the airport turns from the taxiway into the gate area, evaluation device 24 has no information concerning the approaching object. Sensor distances d of points 26, 28 may be obtained at random from distance pattern 20 generated by the radar beams of first radar sensor 12. Their relative distance 30 to one another is observed during the approach of aircraft 2. If this relative distance 30 remains constant, evaluation device 24 initially infers that an undetermined moving object is approaching parking position 3. Via a database 25, evaluation device 24 verifies whether distance pattern 20 is known and ascertains therefrom if the approaching object is an aircraft 2 and which aircraft 2 it is. After that, points 26 and 28 may accordingly be assigned to nose 23 and vertical stabilizer 21 of ascertained aircraft 2.

Figure 5:
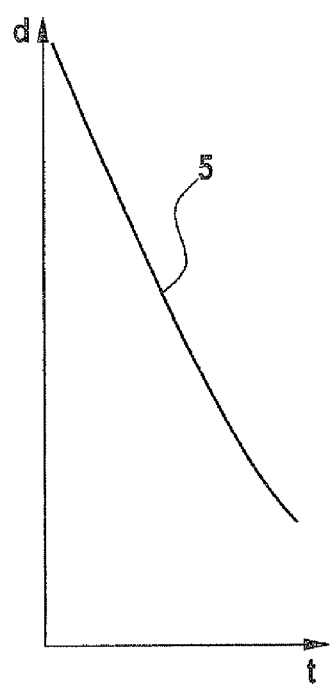
FIG. 5 shows the curve over time of a distance measurement using the measuring configuration according to FIG. 1.

If aircraft 2 is characterized, it is possible to determine point 31 on the aircraft which is intended to stop at parking position 3. Its parking position distance 5 to parking position 3 may then be calculated by the evaluation device, for example, geometrically. The curve over time of parking position distance 5 is represented in FIG. 5. Parking position distance 5 may already be detected if aircraft 2 exits the taxiway and thus still has a parking position distance 5 of approximately 150 meters to its parking position 3. To that end, it is only necessary for database 25 to have stored distance pattern 20 of approaching aircraft 2 to be able to carry out the appropriate identification.

Figure 6:
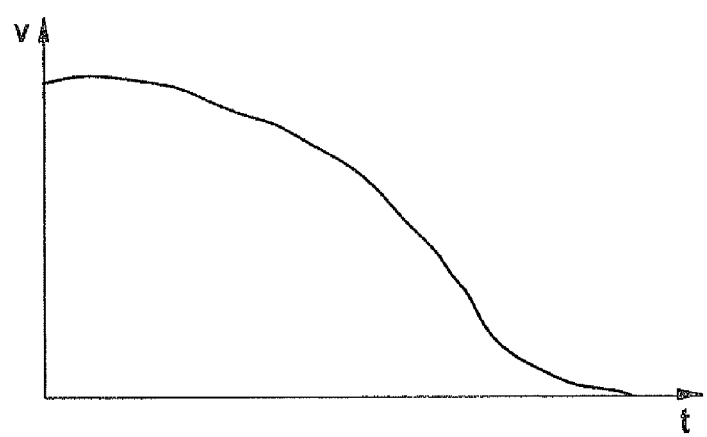
FIG. 6 shows the curve over time of a velocity measurement using the measuring configuration according to FIG. 1.

In addition to parking position distance 5 of aircraft 2 from its parking position 3, it is also possible to detect approach velocity v to parking position 3. The curve over time of this approach velocity v is represented in FIG. 6. Approach velocity v may be derived directly from parking position distance 5. Alternatively or in addition, the frequency change of the radar signal caused by moving aircraft 2 based on the Doppler Effect may be utilized. This velocity may be detected in both sensing planes 16, 18 and compared with one another by both measuring methods in order to determine, for example, functional errors in the system. If evaluation device 24 detects an excess velocity, it is able to output an appropriate warning signal 32 to the pilot.

The determination of distance patterns 20, 22 is still possible even under adverse weather conditions. To increase the failure safety of radar sensors 12, 14, a lens heater (not shown) may be provided to keep radar sensors 12, 14 free from ice and snow.

What is claimed is:

1. A device comprising:
   a measuring device having an evaluation unit for determining a position of an object moving in a space, the measuring device having a distance sensor being aimed at the object and communicatively coupled with the evaluation unit, the measuring device being configured to:
     detect over time, by the distance sensor, a first distance from a first point on the object to the measuring device;
     detect over time, by the distance sensor, a second distance from a second point on the object to the measuring device;
     determine, by the evaluation unit, based on the detected first distance and the detected second distance, a relative distance between the first point and the second point over time;
     determine, by the evaluation unit, whether the determined relative distance remains constant over time; and
     in response to the determined relative distance remaining constant over time, determine, by the evaluation unit the position of the object moving in the space,
   wherein the object is physically separate from the measuring device.

2. The device as recited in claim 1, wherein the evaluation unit of the measuring device is configured to determine a distance of the object to a reference element.

3. The device as recited in claim 2, wherein the evaluation unit of the measuring device is configured to determine a change of the distance of the object to the reference element over time.

4. The device as recited in claim 3, further comprising:
   a display device configured to display information regarding at least one of (i) the distance of the object to the reference element, and (ii) the change of the distance of the object to the reference element.

5. The device as recited in claim 1, wherein the distance sensor of the measuring device includes a radar sensor which detects points having a high backscatter power in order to detect the relative distance.

6. The device as recited in claim 5, wherein the radar sensor has a heating element for heating at least one of a transmission path and a receiving path of the radar sensor.

7. The device as recited in claim 5, wherein the object moving in space is an aircraft docking at a gate area.

8. A method comprising:
detecting over time, using a distance sensor of a measuring device, a first distance from a first point on an object to the measuring device;
detecting over time, using the distance sensor of the measuring device, a second distance from a second point on the object to the measuring device;
determining, using an evaluation unit of the measuring device, based on the detected first distance and the detected second distance, a relative distance between the first point and the second point over time;
determining, using the evaluation unit, whether the relative distance remains constant over time; and
in response to the determined relative distance remaining constant over time, determining, using the evaluation unit, the position of the object moving in the space;
wherein the object is physically separate from the measuring device.

9. A device comprising:
a measuring device having an evaluation unit for determining a position of an object moving in a space, the measuring device having a distance sensor being aimed at the object and communicatively coupled with the evaluation unit, the measuring device being configured to:
detect over time, by the distance sensor, a first distance from a first point on the object to the measuring device;
detect over time, by the distance sensor, a second distance from a second point on the object to the measuring device;
determine, by an evaluation unit, based on the detected first distance and the detected second distance, a relative distance between the first point and the second point over time;
determine, by the evaluation unit, whether the determined relative distance remains constant over time; and
in response to the determined relative distance remaining constant over time, determine, by the evaluation unit, the position of the object moving in the space,
wherein the object is physically separate from the measuring device, and
wherein each of the first point on the object and the second point on the object is selected from any part of the object moving in space that has a direct line of detection from the measuring device at the time of the detection.

10. A device comprising:
a measuring device having an evaluation unit for determining a position of an object moving in a space, the measuring device having a distance sensor being aimed at the object and communicatively coupled with the evaluation unit, the measuring device being configured to:
detect over time, by the distance sensor, a first distance from a first point on the object to the measuring device;
detect over time, by the distance sensor, a second distance from a second point on the object to the measuring device;
determine, by the evaluation unit, based on the detected first distance and the detected second distance, a relative distance between the first point and the second point over time;
determine, by the evaluation unit, whether the determined relative distance remains constant over time; and
in response to the determined relative distance remaining constant over time, determine, by the evaluation unit, the position of the object moving in the space,
wherein the object is physically separate from the measuring device,
wherein the distance sensor of the measuring device detects over time the first distance from the first point on the object to the measuring device and detects over time the second distance from the second point on the object to the measuring device, the first and second points lying in a first plane,
wherein the distance sensor of the measuring device detects over time a third distance from a third point on the object to the measuring device and detects over time a fourth distance from a fourth point on the object to the measuring device, the third and fourth points lying in a second plane different from the first plane,
wherein the measuring device determines, by the evaluation unit, from the detected third and fourth distances, a further relative distance between the third and fourth points over time,
wherein the measuring device determines, by the evaluation unit, whether the determined further relative distance between the third and fourth points remains constant over time, and
wherein the measuring device determines, by the evaluation unit, the position of the object moving in the space if relative distance between the first and second points remains constant over time regardless of whether the further relative distance between the third and fourth points remains constant over time.

11. The device as recited in claim 10,
wherein the first and second points lie along a first axis situated on the first plane, and
wherein the third and fourth points lie along a second axis situated on the second plane.

12. The device as recited in claim 11,
wherein the first axis is situated perpendicular to the second axis.

13. The device as recited in claim 10,
wherein the measuring device includes a first detection sensor and a second detection sensor,
wherein the first detection sensor detects over time the first distance and the second distance, and
wherein the second detection sensor detects over time the third distance and the fourth distance.

14. The method as recited in claim 8, further comprising determining by the evaluation unit one of: a position of the detected object moving in space relative to a reference element, and a distance of the detected object to the reference element.

15. The method as recited in claim 14, further comprising:
determining, by the evaluation unit, a change of the distance of the detected object to the reference element over time; and
calculating, by the evaluation unit, an approach velocity from the determined change of the distance of the detected object to the reference element over time.

* * * * *